(12) United States Patent
Vinci et al.

(10) Patent No.: US 9,738,820 B1
(45) Date of Patent: Aug. 22, 2017

(54) URETHANE ADHESIVE

(71) Applicant: Dow Global Technologies LLC, Midland, MI (US)

(72) Inventors: Daniele Vinci, Lucerne (CH); Peter Bossert, Bremgarten (CH)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/500,537

(22) PCT Filed: Aug. 4, 2015

(86) PCT No.: PCT/US2015/043569
§ 371 (c)(1),
(2) Date: Jan. 31, 2017

(87) PCT Pub. No.: WO2016/025234
PCT Pub. Date: Feb. 18, 2016

Related U.S. Application Data

(60) Provisional application No. 62/036,136, filed on Aug. 12, 2014.

(51) Int. Cl.
| | |
|---|---|
| *C09J 175/08* | (2006.01) |
| *C08G 18/50* | (2006.01) |
| *C08G 18/73* | (2006.01) |
| *C09J 5/00* | (2006.01) |

(52) U.S. Cl.
CPC ........ *C09J 175/08* (2013.01); *C08G 18/5024* (2013.01); *C08G 18/73* (2013.01); *C09J 5/00* (2013.01); *C09J 2475/00* (2013.01)

(58) Field of Classification Search
CPC ...................................................... C09J 175/08
See application file for complete search history.

(56) References Cited

U.S. PATENT DOCUMENTS

| | | | |
|---|---|---|---|
| 2005/0010013 A1* | 1/2005 | Marcinko | C08G 18/12 528/69 |
| 2009/0227695 A1* | 9/2009 | Burdeniuc | C08G 18/4072 521/113 |
| 2010/0010110 A1* | 1/2010 | Prange | C08G 18/36 521/115 |
| 2015/0183922 A1 | 7/2015 | Nakagawa et al. | |

* cited by examiner

*Primary Examiner* — Daniel Lee
(74) *Attorney, Agent, or Firm* — Carl P. Hemenway

(57) ABSTRACT

Provided is an adhesive composition comprising (A) one or more polyisocyanate and (B) one or more polymeric polyol, wherein said polymeric polyol is a reaction product of (I) a polyol initiator, wherein said polyol initiator is a reaction product of (a) one or more dihydroxy tertiary amine compound, and (b) a polyhydroxy alcohol, and (II) one or more epoxide compound or one or more glycidyl ether compound or a mixture thereof; wherein said adhesive composition contains solvent in an amount of 0 to 5% by weight based on the weight of said adhesive composition. Also provided is a method of bonding substrates using such an adhesive composition.

5 Claims, No Drawings

URETHANE ADHESIVE

A useful class of adhesive compositions are solvent-free urethane adhesives, which are liquid compositions that contain a polyisocyanate and a polyol, possibly among other ingredients. When such a composition is brought into contact with two substrates and then exposed to conditions, such as elevated temperature, in which the polyisocyanate and the polyol react with each other to form a cured composition, it is desirable that the cured composition form a bond between the two substrates. It is desirable that the adhesive composition is a liquid composition that has the following properties: relatively low viscosity when it is first mixed; viscosity that remains low for a period of time that is long enough to thoroughly mix the ingredients and apply the composition to a substrate; adhesive strength that builds relatively quickly after the composition is applied to a substrate (the "green tack"); and ultimate bond strength when fully cured that can withstand thermal cycles and exposure to chemicals.

US 2010/0010110 describes flexible polyurethane foams that are prepared by reacting a polyisocyanate with a high equivalent weight polyol, which includes at least one polyether or polyester polyol that contains at least one tertiary amine group. It is desired to provide an adhesive composition that has some or all of the above-mentioned desirable properties.

The following is a statement of the invention.

A first aspect of the present invention is an adhesive composition comprising
(A) one or more polyisocyanate and
(B) one or more polymeric polyol, wherein said polymeric polyol is a reaction product of
 (I) a polyol initiator, wherein said polyol initiator is a reaction product of
  (a) one or more dihydroxy tertiary amine compound having the structure I:

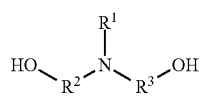

I wherein $R^1$ is hydrogen or a $C_1$-$C_6$ linear or branched alkyl group, and
$R^2$ and $R^3$ are independently a $C_1$-$C_6$ linear or branched alkyl group, and
 (b) a polyhydroxy alcohol, and
(II) one or more epoxide compound having the structure X:

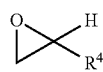

X or one or more glycidyl ether compound having the structure XI:

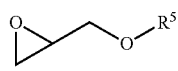

XI or a mixture thereof;
wherein $R^4$ is hydrogen, phenyl, cyclohexyl, or a $C_1$-$C_{18}$ linear or branched alkyl, and
$R^5$ is hydrogen, phenyl, a $C_1$-$C_6$ linear or branched alkyl-substituted phenyl, or a $C_1$-$C_{18}$ linear or branched alkyl,
wherein said adhesive composition contains solvent in an amount of 0 to 5% by weight based on the weight of said adhesive composition.

A second aspect of the present invention is a method of bonding a first substrate to a second substrate comprising
(i) applying a layer of the adhesive composition of claim 1 to a surface of said first substrate;
(ii) then bringing a surface of said second substrate into contact with said layer of the adhesive composition of claim 1; and
(iii) then curing said layer of the adhesive composition of claim 1.

The following is a detailed description of the invention.

As used herein, the following terms have the designated definitions, unless the context clearly indicates otherwise.

A "polyol" is a compound having two or more pendant hydroxyl groups. An "ester polyol" is a polyol that contains one or more ester linkage. A "polyester polyol" is a polyol that contains two or more ester linkages. An ester linkage has the structure —C(O)—O—. An "ether polyol" is a polyol that has one or more ether linkage. A "polyether polyol" is a polyol that has two or more ether linkages. An ether linkage is —C—O—C—. A "hybrid polyol" is a polyol that contains at least one ester linkage and at least one ether linkage. A urethane linkage is —NH—C(O)—O—.

A characteristic of a polyol is the hydroxyl number, which is measured according to ASTM D4274-11 (American Society for Testing and Materials, Conshohocken, Pa., USA) and is reported in units of milligrams of KOH per gram (mg-KOH/g). The hydroxyl numbers considered herein are reported without any acidity correction having been made. Another characteristic of a polyol is the acid number, which is measured using ASTM D974-12 and reported in units of mgKOH/g.

A "polyisocyanate" is a compound having two or more isocyanate groups. An isocyanate group is —NCO. A monomeric polyisocyanate is a polyisocyanate having molecular weight of 300 or less and having no uretdione structure, no isocyanurate structure, no biuret structure, and no urethane linkage. A dimer polyisocyanate is a polyisocyanate having the molecular structure of two monomeric polyisocyanates bonded together in a uretdione structure. A trimer polyisocyanate is a polyisocyanate having the molecular structure of three monomeric polyisocyanates bonded together in an isocyanurate structure.

An aromatic compound is a compound that contains one or more aromatic ring. An aliphatic compound is a compound that contains no aromatic rings.

When a ratio is said herein to be X:1 or greater, it is meant that the ratio is Y:1, where Y is greater than or equal to X. For example, if a ratio is said to be 3:1 or greater, that ratio may be 3:1 or 5:1 or 100:1 but may not be 2:1. Similarly, when ratio is said herein to be W:1 or less, it is meant that the ratio is Z:1, where Z is less than or equal to W. For example, if a ratio is said to be 15:1 or less, that ratio may be 15:1 or 10:1 or 0.1:1 but may not be 20:1.

As used herein, a "solvent" is a compound that is liquid over a range of temperatures that includes 20° C. to 50° C. and that does not react with any of the polyisocyanates or polyols used in the present invention.

As used herein, a "film" is a material of any composition that is relatively small in one dimension, called the "thickness," in comparison to the other two dimensions. Films have thickness of 2 micrometer to 1 millimeter. The size of a film in each dimension other than the thickness is at least 100 times the thickness. Films are flexible; at 25° C., a film may be bent to a 90° angle at a radius of curvature of 1 cm without breaking. The "surface" of a film is the flat face of the film that is perpendicular to the thickness dimension.

The present invention discloses an initiator composition for the production of polyether polyols and polyurethane polymers made therefrom. The initiator composition is the reaction product of a dihydroxy tertiary amine and a polyhydroxy alcohol (1). Preferably the dihydroxy tertiary amine has the following structure I:

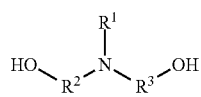

I $R^1$ is hydrogen or a $C_1$-$C_6$ linear or branched alkyl group, preferably a $C_1$-$C_4$ linear or branched alkyl group, more preferably methyl. $R^2$ and $R^3$ are independently a $C_1$-$C_6$ linear or branched alkyl group, preferably a $C_1$-$C_4$ linear or branched alkyl group, more preferably ethyl. Preferably the dihydroxy tertiary amine is N-methyl diethanolamine (MDEA).

Suitable polyhydroxy alcohols (1) are alcohols having from 2 to 8 hydroxyl groups, they may be $C_2$ to $C_{18}$ alkyl, aryl, or alkaryl and they may be linear, branched, or cyclic. Preferably polyhydroxy alcohols (1) are methylenglycol (MEG), diethylenglycol (DEG), methylpropylenglycol (MPG), dipropyleneglycol (DPG), glycerol, trimethylol propane, (TMP), pentaerythritol, and sugars such as sucrose and sorbitol). Most preferred polyhydroxy alcohols (1) are glycerine, glycol, and sugars.

A preferred initiator composition shown in Scheme 1 is the reaction products of MDEA and glycerine:

Scheme 1

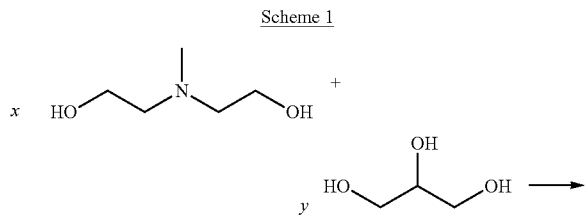

where x is preferably an integer of from 1 to 10 and independently y is preferably an integer of from 1 to 10.

The reaction product of the dihydroxy tertiary amine and the polyhydroxy alcohol (1) may comprise a mixture of products as well as partially and/or completely unreacted tertiary amine and/or polyhydroxy alcohol (1). For example the reaction of N-methyl diethanol amine and glycerine in addition to unreacted N-methyl diethanolamine and/or glycerine, may yield a mixture of products comprising one or more of, but not limited to:

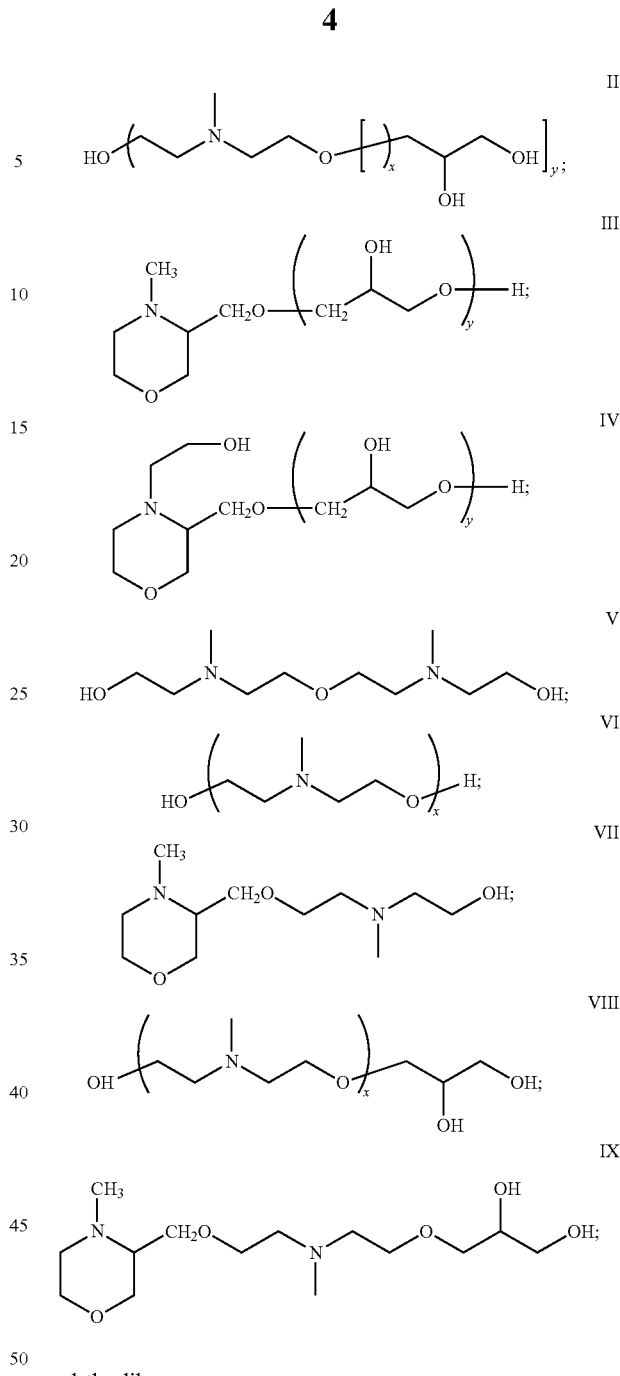

and the like.

Preferably, the mole ratio of the dihydroxy tertiary amine to the polyhydroxy alcohol (1) is 10:1 or less; more preferably 5:1 or less; more preferably 3:1 or less. Preferably, the mole ratio of the dihydroxy tertiary amine to the polyhydroxy alcohol is 0.1:1 or more; more preferably 0.2:1 or more; more preferably 0.3:1 or more.

A particularly preferred initiator composition is one wherein there are more than one tertiary amine, preferably N-methyl amine, group in the backbone of reaction product between the dihydroxy tertiary amine and polyhydroxy alcohol (1) product. For example, for structure II, x is preferably greater than 1, more preferably 2, more preferably 3, more preferably 4, more preferably 5. N-methyl amine presence may be determined and quantified by Matrix-assisted laser desorption/ionization (MALDI) and Nuclear Magnetic Resonance (NMR) spectroscopy.

The above initiator composition preferably has weight average molecular weight (Mw) equal to or less than 5,000, more preferably equal to or less than 3,000, more preferably equal to or less than 1,700, more preferably equal to or less than 1,000. The above initiator composition preferably has Mw equal to or greater than 180, more preferably equal to or greater than 250, and more preferably equal to or greater than 600. The Mw data in accordance with this disclosure can be determined by Gel Permeation Chromatography.

The above initiator composition preferably has an average hydroxyl number (reported as mg KOH/g) equal to or greater than 34, more preferably equal to or greater than 56, more preferably equal to or greater than 99, more preferably equal to or greater than 169. The above initiator composition preferably has an average hydroxyl number equal to or less than 935, more preferably equal to or less than 674, more preferably equal to or less than 280. The hydroxyl number is measured by ASTM D4274 D.

The initiator composition comprising the reaction products of the dihydroxy tertiary amine I and a polyhydroxy alcohol (1) as described herein above is useful to produce a polymeric polyol (B) composition comprising polymeric polyol (B) compounds. A first polymeric polymer (B) composition is the reaction product(s) of an initiator composition as described herein above with at least one epoxide compound having the structure X:

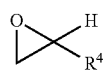

or at least one glycidyl ether compound having the structure XI:

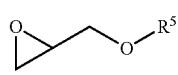

or a combination thereof; wherein $R^4$ is hydrogen, phenyl, cyclohexyl, or a $C_1$-$C_{18}$ linear or branched alkyl; and $R^5$ is hydrogen, phenyl, a $C_1$-$C_6$ linear or branched alkyl-substituted phenyl, or a $C_1$-$C_{18}$ linear or branched alkyl.

In formula X, $R^4$ can be hydrogen, phenyl, cyclohexyl, or a $C_1$-$C_{18}$ linear or branched alkyl. In accordance with one aspect of the present invention, $R^4$ is methyl, ethyl, propyl, butyl, pentyl, hexyl, heptyl, 2-ethylhexyl, octyl, decyl, dodecyl, tetradecyl, hexadecyl, or octadecyl. In another aspect, $R^4$ can be hydrogen, phenyl, or cyclohexyl. In yet another aspect, $R^4$ is hydrogen, methyl, or phenyl. In this aspect, where $R^4$ is hydrogen, methyl, butyl, or phenyl, the epoxide compounds of formula X are, respectively, ethylene oxide, propylene oxide, butylene oxide, or styrene oxide.

$R^5$ in formula XI can be hydrogen, phenyl, a $C_1$-$C_6$ linear or branched alkyl-substituted phenyl, or a $C_1$-$C_{18}$ linear or branched alkyl. For instance, $R^5$ can be hydrogen, phenyl, or a $C_1$-$C_6$ linear or branched alkyl-substituted phenyl, in one aspect of this invention. $R^5$ is methyl, ethyl, propyl, butyl, pentyl, hexyl, heptyl, 2-ethylhexyl, octyl, decyl, dodecyl, tetradecyl, hexadecyl, or octadecyl, in another aspect of this invention. Yet, $R^5$ can be phenyl or butyl-substituted phenyl in still another aspect of this invention.

The above resulting polymeric polyol (B) composition preferably has a Mw equal to or less than 8,000, more preferably equal to or less than 7,000, and even more preferably equal to or less than 6,000. The above resulting polymeric polyol (B) composition preferably have a Mw equal to or greater than 2,000, more preferably equal to or greater than 3,000, and more preferably equal to or greater than 4,000.

The polymeric polyol (B) composition disclosed herein above preferably has a hydroxyl number of equal to or less than 800 mg KOH/g, more preferably equal to or less than 300, more preferably equal to or less than 170, more preferably equal to or less than 100, and even more preferably equal to or less than 75 mg KOH/g. The resulting polymeric polyol composition (B) disclosed herein above preferably has a hydroxyl number equal to or greater than 15 mg KOH/g, more preferably equal to or greater than 20, more preferably equal to or greater than 25, more preferably equal to or greater than 35, and even more preferably equal to or greater than 50 mg KOH/g. Hydroxyl number is determined according to ASTM D 4274.

In another aspect of the present invention, the herein above polymeric polyol (B) composition preferably has an average functionality (F) equal to or less than 8, preferably equal to or less than 7, more preferably equal to or less than 6, more preferably equal to or less than 5, and even more preferably equal to or less than 4. Preferably, the above polymeric polyol (B) composition has an average functionality equal to or greater than 2, and more preferably equal to or greater than 3.

The polymeric polyol compositions of this invention also can be characterized by nitrogen content. For instance, amine values of polymeric polyol compositions disclosed herein above are equal to or less than 5 mg/g, preferably equal to or less than 4, more preferably equal to or less than 3, more preferably equal to or less than 2 mg/g. Nitrogen content is determined according to ASTM D 6979 and reported as mg/g.

Making polymeric polyol compositions is well known in the art; any suitable process to make polymeric polyol compositions (B) from initiator I above is acceptable. For instance, initiator I can be mixed with a catalyst, and this mixture can be subsequently reacted with ethylene oxide or propylene oxide at a temperature in a range from about 100° C. to 160° C. A traditional catalyst used in this reaction, and known to those of skill in the art, is KOH. Other alkaline hydroxide or hydroxide hydrate catalysts based on Ba (barium) or Sr (strontium) can be employed as the alkoxylation catalyst; producing products with less unsaturation than those produced using the traditional KOH catalyst. Processes for producing polyols using Ba or Sr catalysts are described in U.S. Pat. Nos. 5,070,125; 5,010,187; and 5,114,619.

In addition to polymeric polyol (B), the adhesive composition of the present invention optionally contains one or more additional polyols. Preferred additional polyols are polyester polyols. Preferred additional polyols have functionality of 2 to 2.5. Preferred additional polyols have hydroxyl number of 50 to 150. Preferred additional polyols that are polyester polyols are preferably reaction products of one or more diacid and one or more polyol. Preferred diacids for use in making such polyester polyols are adipic acid, isophthalic acid, terephthalic acid, and mixtures thereof. Preferred polyols for use in making such polyester polyols are ethylene glycol, diethylene glycol, trimethylol propane, and mixtures thereof.

Preferably, the ratio of the weight of all additional polyols to the weight of all polymeric polyols (B) is 0:1 to 1:1; more preferably 0:1 to 0.45:1; more preferably 0:1 to 0.3:1; more preferably 0:1 to 0.15:1; more preferably 0:1.

The adhesive composition of the present invention comprises one or more polyisocyanate. Polyisocyanates may be aromatic or aliphatic; preferred are aliphatic. Preferred polyisocyanates are one or more monomeric polyisocyanates, one or more dimer polyisocyanates, one or more trimer polyisocyanates, one or more polyisocyanate prepolymers, and mixtures thereof. Preferred monomeric polyisocyanates are hydrogenated diphenylmethane diisocyanate (MDI) (any isomer), isophorone diisocyanate, hexan-1,6-diisocyanate (HDI), hexamethylene diisocyanate, 2,2,4-trimethyl-hexamethylene diisocyanate, 2,4,4-trimethyl-hexamethylene diisocyanate, and mixtures thereof.

Preferred dimer polyisocyanates and trimer polyisocyanates are dimers and trimers of preferred monomeric polyisocyanates. Preferred dimer polyisocyanates and trimer polyisocyanates are dimers and trimers in which the individual monomeric constituents are identical to each other. For example, a preferred trimer polyisocyanate is "HDI trimer," which has the structure of three HDI molecules bonded together in an isocyanurate structure.

Polyisocyanate prepolymers are reaction products of monomeric polyisocyanates with one or more polyol. Each polyisocyanate prepolymer has two or more pendant isocyanate groups. Preferred polyisocyanate prepolymers contain reaction products of one or more aliphatic monomeric polyisocyanate with one or more aliphatic polyether polyol, one or more aliphatic polyester polyol, one or more aliphatic hybrid polyol, or a mixture thereof. Preferred polyisocyanate prepolymers contain a reaction product of HDI with one or more aliphatic polyether polyol, one or more aliphatic polyester polyol, one or more aliphatic hybrid polyol, or a mixture thereof. Preferred polyisocyanate prepolymers contain reaction products of one or more aliphatic monomeric polyisocyanate with one or more aliphatic polyether polyol and, optionally, one or more additional aliphatic polyol. Preferably, in the formation of a polyisocyanate prepolymer, isocyanate groups react with hydroxyl groups to form urethane linkages.

The relative amounts of polyol and polyisocyanate in the adhesive composition of the present invention may be characterized by the equivalent ratio, which is the ratio of all the moles of isocyanate groups to all the moles of hydroxyl groups. Preferably, the equivalent ratio is 1:1 or higher; more preferably 1.01 or higher; more preferably 1.3:1 or higher; more preferably 1.3:1 or higher; more preferably 1.6:1 or higher; more preferably 2:1 or higher; more preferably 2.3:1 or higher. Preferably, the equivalent ratio is 5:1 or lower; more preferably 4.7:1 or lower; more preferably 4.3:1 or lower; more preferably 4:1 or lower; more preferably 3.7:1 or lower.

The adhesive composition of the present invention contains solvent in an amount, by weight based on the weight of the adhesive composition, of 0 to 5%; preferably 0 to 3%; more preferably 0 to 1%; more preferably 0 to 0.5%; more preferably 0 to 0.1%.

The adhesive composition of the present invention optionally contains one or more adjuvant. An adjuvant is a compound that is not a polyisocyanate, not a polyol, and not a solvent. Preferred adjuvants are plasticizers; nonreactive thermoplastic polymers; catalysts; thickeners; stabilizers to protect against degradation by heat, visible light, or ultraviolet light; flame retardant substances; biocides; surfactants; and mixtures thereof. Preferably, the total weight of all adjuvants, based on the weight of the adhesive composition, is 0 to 5%; more preferably 0 to 3%; more preferably 0 to 1%; more preferably 0 to 0.5%; more preferably 0 to 0.1%.

The adhesive composition of the present invention may be used for any purpose. A preferred use is to bond two substrates together. Such bonding is preferably accomplished by applying a layer of the adhesive composition to a surface of a first substrate, then bringing a surface of a second substrate into contact with that layer of the adhesive composition, thus forming an assembled article. The assembled article is then preferably exposed to conditions that promote a curing reaction between the isocyanate groups and the hydroxyl groups in the adhesive composition.

A preferred type of assembled article is a laminate, which is an article in which two or more films are bonded to each other. To form a laminate, a layer of the adhesive composition of the present invention is applied to one surface of a first film, then a surface of a second film is brought into contact with the layer of the adhesive composition. The assembled article thus formed is optionally exposed to mechanical pressure to bring the films into closer contact, either before or during the curing reaction between the isocyanate groups and the hydroxyl groups in the adhesive composition. Optionally, mechanical pressure is applied by passing the assembled article through the nip of two closely spaced rollers. Optionally, additional films may be bonded to the assembled article, either using additional layers of the adhesive composition of the present invention or else using layers of other adhesive compositions.

Preferably, formation of the assembled article is performed at temperature below 35° C., more preferably 20° C. to 30° C. In order to promote the curing reaction between the isocyanate groups and the hydroxyl groups in the adhesive composition, the assembled article is preferably heated to a temperature above 35° C., more preferably to a temperature of 40° C. to 60° C. Optionally, the assembled article may be held at a temperature of 35° C. or higher for a period of 8 weeks or less; more preferably 6 weeks or less. If the assembled article is exposed to mechanical pressure after application of the adhesive composition, the assembled article may optionally held at a temperature above 35° C. while the pressure is applied, and the temperature is optionally different at different locations on the assembled article. Optionally, the adhesive composition may be applied at one temperature that is above 35° C., and the portion of the assembled article that is exposed to mechanical pressure may be at a temperature that is above 35° C. and that is different from the temperature at which the adhesive composition is applied.

It is preferable that the adhesive composition be liquid at 25° C. It is more preferable that the adhesive composition has a relatively low viscosity at 25° C., in order to facilitate the process of applying a layer of the adhesive composition to a surface of a substrate.

When the assembled article is exposed to elevated temperature to promote the curing reaction, it is desired that the viscosity of the adhesive composition remain low for a time (the "open time") in order to allow for re-positioning if desired. However, it is desired that the open time be relatively short. It is further desired that, after the open time, the viscosity of the adhesive composition increase quickly. It is considered that a rapid increase in viscosity will create a bond (called "green tack") between the substrates, which will allow the assembled article to be gently handled and/or moved without the substrates slipping relative to each other, even though the adhesive composition may not yet be fully cured. It is also desired that, when the adhesive composition is fully cured, the bond between the substrates should be relatively strong, even after exposure to elevated temperature and/or exposure to water, oil, foods, or other chemicals.

The following are examples of the present invention.

In the following examples, the following terms are used:

F=functionality. For polyols, this means the number of hydroxyl groups per molecule. For polyisocyanates, this means the number of isocyanate groups per molecule. For a mixture or a distribution, F is the number average functionality.

OHN=hydroxyl number

Visc50=viscosity at 50° C., measured by cone and plate rheometer at 10 sec-1. Rheometer was model MCR 301 from Anton Paar.

HDI=hexadecyl-1,6-diisocyanate

EG=ethylene glycol

DEG=diethylene glycol

TMP=trimethylol propane

Mw=weight-average molecular weight

In the following examples, the following polyols were used. Only polyol B1 is an example of the polymeric polyol (B) described above.

| label | F | OHN | Visc25 (mPa·s) | description |
|---|---|---|---|---|
| B1 | 4.0 | 37.0 | 1200 | example of polymeric polyol (B) |
| R1 | 2.0 | 136 | 1700 to 2100 | polyester polyol made from adipic acid, isophthalic acid, and DEG |
| R2 | 2.0 | 112 | 5600 to 9200 | polyester polyol made from adipic acid, isophthalic acid, and DEG |
| R3 | 2.0 | 64 | 4700 to 6900 | polyester polyol made from adipic acid, isophthalic acid, and DEG |
| R4 | 2.14 | 135 | | polyester polyol made from adipic acid, isophthalic acid, terephthalic acid, EG, and TMP |
| R5 | 2.0 | 112 | | polyester polyol made fromm adipic acid and DEG |
| M1 | 3.01 | 282.2 | 350 | Equimolar blend of polyether triol of Mw above 600 with polyether triol of Mw below 600. |
| M2 | 2.09 | 127.33 | 4000 to 7000 | Blend of R4 (2 parts by weight) and R5 (1 part by weight) |

The following polyisocyanates were used:

NCO1=HDI trimer

NCO2=prepolymer of TDI and polyethylene glycol

The following adhesive compositions were made. Comparative adhesives are labeled with "-C" suffix. The amounts shown are parts by weight.

| | Adhesive Compositions (parts by weight) | | | | | | | |
|---|---|---|---|---|---|---|---|---|
| No. | NCO1 | NCO2 | M2 | M1 | B1 | R1 | R2 | R3 |
| 1-C | 60 | | | 100 | | | | |
| 2-C | | 30 | | 100 | | | | |
| 3 | 20 | | | | 100 | | | |
| 4 | 25 | | | | 90 | 10 | | |
| 5 | 35 | | | | 70 | 30 | | |
| 6 | 25 | | | | 90 | | 10 | |
| 7 | 35 | | | | 70 | | 30 | |
| 8 | 20 | | | | 90 | | | 10 |
| 9 | 25 | | | | 70 | | | 30 |

The curing of some of the adhesive compositions was measured as follows. The ingredients shown in the table above were mixed and then the mixture was heated to 50° C. While held at 50° C., the viscosity (Visc50) of the mixture was measured as described above. Results were as follows:

| Viscosity at 50° C. (mPa·s) vs. Time (minutes) | | | |
|---|---|---|---|
| Time (min) | 2-C | 1-C | 3 |
| 1 | 553 | 506 | 138 |
| 2 | 599 | 502 | 139 |
| 3 | 647 | 505 | 140 |
| 4 | 695 | 508 | 141 |
| 5 | 743 | 511 | 142 |
| 6 | 790 | 513 | 144 |
| 7 | 834 | 515 | 146 |
| 8 | 878 | 517 | 147 |
| 9 | 921 | 518 | 149 |
| 10 | 961 | 520 | 151 |
| 11 | 1000 | 521 | 153 |
| 12 | 1040 | 522 | 156 |
| 13 | 1080 | 523 | 158 |
| 14 | 1120 | 524 | 160 |
| 15 | 1150 | 526 | 163 |
| 16 | 1180 | 527 | 165 |
| 17 | 1210 | 528 | 167 |
| 18 | 1250 | 529 | 170 |
| 19 | 1280 | 531 | 173 |
| 20 | 1310 | 532 | 176 |
| 21 | 1340 | 533 | 179 |
| 22 | 1380 | 535 | 183 |
| 23 | 1410 | 536 | 186 |
| 24 | 1440 | 537 | 189 |
| 25 | 1470 | 538 | 193 |
| 26 | 1500 | 540 | 197 |
| 27 | 1530 | 541 | 200 |
| 28 | 1550 | 542 | 204 |
| 29 | 1580 | 544 | 208 |
| 30 | 1610 | 545 | 212 |
| 31 | 1640 | 546 | 217 |
| 32 | 1680 | 548 | 221 |
| 33 | 1720 | 548 | 225 |
| 34 | 1750 | 549 | 230 |
| 35 | 1780 | 551 | 235 |
| 36 | 1800 | 552 | 240 |
| 37 | 1830 | 553 | 246 |
| 38 | 1860 | 555 | 251 |
| 39 | 1890 | 557 | 256 |
| 40 | 1920 | 558 | 262 |
| 41 | 1950 | 560 | 268 |
| 42 | 1970 | 562 | 275 |
| 43 | 2000 | 563 | 281 |
| 44 | 2030 | 565 | 288 |
| 45 | 2060 | 567 | 294 |
| 46 | 2080 | 568 | 301 |
| 47 | 2130 | 570 | 309 |
| 48 | 2150 | 572 | 316 |
| 49 | 2180 | 573 | 324 |
| 50 | 2210 | 575 | 332 |
| 51 | 2240 | 577 | 340 |
| 52 | 2270 | 579 | 349 |
| 53 | 2290 | 580 | 358 |
| 54 | 2320 | 582 | 367 |
| 55 | 2340 | 584 | 376 |
| 56 | 2360 | 586 | 387 |
| 57 | 2390 | 588 | 397 |
| 58 | 2420 | 590 | 407 |
| 59 | 2450 | 592 | 418 |
| 60 | 2470 | 594 | 429 |
| 61 | 2500 | | 441 |
| 62 | 2540 | | 453 |
| 63 | 2560 | | 466 |
| 64 | 2590 | | 479 |
| 65 | 2630 | | 493 |
| 66 | 2650 | | 508 |
| 67 | 2670 | | 523 |
| 68 | 2690 | | 539 |
| 69 | 2700 | | 556 |
| 70 | 2720 | | 572 |
| 71 | 2760 | | 590 |
| 72 | 2790 | | 609 |
| 73 | 2790 | | 630 |
| 74 | 2800 | | 651 |
| 75 | 2810 | | 672 |
| 76 | 2830 | | 695 |
| 77 | 2870 | | 720 |

-continued

| Time (min) | 2-C | 1-C | 3 |
|---|---|---|---|
| 78 | 2910 | | 745 |
| 79 | 3080 | | 772 |
| 80 | 3060 | | 800 |
| 81 | 3130 | | 829 |
| 82 | 3170 | | 860 |
| 83 | 3230 | | 894 |
| 84 | 3310 | | 929 |
| 85 | 3330 | | 965 |
| 86 | 3350 | | 1000 |
| 87 | 3380 | | 1050 |
| 88 | 3400 | | 1090 |
| 89 | 3440 | | 1140 |
| 90 | 3470 | | 1190 |
| 91 | 3470 | | 1240 |
| 92 | 3490 | | 1290 |
| 93 | 3610 | | 1350 |
| 94 | 3630 | | 1420 |
| 95 | 3660 | | 1490 |
| 96 | 3690 | | 1560 |
| 97 | 3720 | | 1640 |
| 98 | 3730 | | 1720 |
| 99 | 3760 | | 1820 |
| 100 | 3780 | | 1920 |
| 101 | 3800 | | 2030 |
| 102 | 3820 | | 2150 |
| 103 | 3880 | | 2280 |
| 104 | 3900 | | 2420 |
| 105 | 3940 | | 2580 |
| 106 | 3990 | | 2760 |
| 107 | 4020 | | 2940 |
| 108 | 4040 | | 3160 |
| 109 | 4060 | | 3400 |
| 110 | 4160 | | 3670 |
| 111 | 4230 | | 3970 |
| 112 | 4270 | | 4310 |
| 113 | 4310 | | 4700 |
| 114 | 4520 | | 5140 |
| 115 | 4530 | | 5650 |
| 116 | 4570 | | 6240 |
| 117 | 4640 | | 6920 |
| 118 | 4710 | | 7740 |
| 119 | 4750 | | 8750 |
| 120 | 4770 | | 10200 |

Examination of the forgoing data shows that the viscosity of adhesive composition 1-C increased at a constant rate from 0 to 60 minutes. Because the rate of increase of the viscosity was constant and very small, it was concluded that composition 1-C would not reach a desirably high viscosity in any reasonable time and so no further measurements on composition 1-C were taken after 60 minutes.

Composition 3 shows a more desirable behavior or viscosity versus time than composition 2-C. The rate of increase of viscosity of composition 2-C is relatively constant, and so it is considered that composition 2-C would require a very long time to achieve viscosity as high as 10,000 mPa·s. In contrast, the viscosity of composition 3 shows a rate of increase that is itself constantly increasing. Thus composition 2-C had relatively low viscosity (below 500 mPa·s) for over 60 minutes, and yet composition 2-C also achieved very high viscosity (above 10,000 mPa·s) in only 120 minutes.

The invention claimed is:

1. An adhesive composition comprising
   (A) one or more polyisocyanates and
   (B) one or more polymeric polyols, wherein said polymeric polyol is a reaction product of
      (I) a polyol initiator, wherein said polyol initiator is a reaction product of
         (a) one or more dihydroxy tertiary amines compound having the structure I:

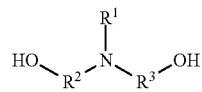

wherein $R^1$ is hydrogen or a $C_1$-$C_6$ linear or branched alkyl group, and
   $R^2$ and $R^3$ are independently a $C_1$-$C_6$ linear or branched alkyl group, and
         (b) a polyhydroxy alcohol, and
      (II) one or more epoxide compound having the structure X:

or one or more glycidyl ether compounds having the structure XI:

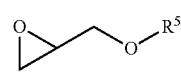

or a mixture thereof;
   wherein $R^4$ is hydrogen, phenyl, cyclohexyl, or a $C_1$-$C_{18}$ linear or branched alkyl, and
   $R^5$ is hydrogen, phenyl, a $C_1$-$C_6$ linear or branched alkyl-substituted phenyl, or a $C_1$-$C_{18}$ linear or branched alkyl,
   wherein said adhesive composition contains solvent in an amount of 0 to 5% by weight based on the weight of said adhesive composition.

2. The adhesive composition of claim 1, wherein said polyisocyanate comprises one or more aliphatic polyisocyanates.

3. The adhesive composition of claim 1, wherein $R^1$ is methyl; $R^2$ and $R^3$ are both ethyl; and said polyhydroxy alcohol is glycerine.

4. A method of bonding a first substrate to a second substrate comprising
   (i) applying a layer of the adhesive composition of claim 1 to a surface of said first substrate;
   (ii) then bringing a surface of said second substrate into contact with said layer of the adhesive composition of claim 1; and
   (iii) then curing said layer of the adhesive composition of claim 1.

5. The method of claim 4, wherein said first substrate is a film and said second substrate is a film.

* * * * *